United States Patent
Jafari et al.

(10) Patent No.: US 7,694,338 B1
(45) Date of Patent: Apr. 6, 2010

(54) SHARED TAP DOS-ATTACK PROTECTION

(75) Inventors: Reza Jafari, Olathe, KS (US);
Mohammed Ghouse Mohiuddin,
Overland Park, KS (US); Len Mosley,
Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1335 days.

(21) Appl. No.: 11/144,259

(22) Filed: Jun. 3, 2005

(51) Int. Cl.
*G06F 11/00* (2006.01)

(52) U.S. Cl. .............................. 726/22; 726/23; 726/25

(58) Field of Classification Search ................ 726/22, 726/25, 23

See application file for complete search history.

(56) References Cited

U.S. PATENT DOCUMENTS

| | | | |
|---|---|---|---|
| 7,099,320 B1 * | 8/2006 | Salerno | 370/389 |
| 7,308,716 B2 * | 12/2007 | Danford et al. | 726/23 |
| 7,336,967 B2 * | 2/2008 | Kelly et al. | 370/468 |
| 2003/0110274 A1 * | 6/2003 | Pazi et al. | 709/229 |
| 2005/0257262 A1 * | 11/2005 | Matityahu et al. | 726/22 |
| 2006/0075491 A1 * | 4/2006 | Lyon | 726/22 |

OTHER PUBLICATIONS

Zang, Hui et al., "Optimal NetFlow and CMON Deployment in IP Networks", Sprint Advanced Technology Laboratories.
Agarwal, Sharad et al., "DDOS Mitigation via Regional Cleaning Centers", Sprint ATL Research Report, Jan. 2004.

* cited by examiner

*Primary Examiner*—Kambiz Zand
*Assistant Examiner*—Amare Tabor (57) ABSTRACT

A method and system are provided for centralizing services subscribed to by customers of a service provider for detecting attacks at the customer-end of a communications network. A signal diverter is installed in a signal path carrying inbound communication signals common to subscribed customers and a portion of the collective inbound signals for each customer is diverted to a detection apparatus. Finally, based on parameters for each subscribed customer, a determination is made as to if a subscribed customer is experiencing an attack.

17 Claims, 9 Drawing Sheets

SHARED TAP DOS-ATTACK PROTECTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Network infrastructures as well as customers of network service providers may be subject to any number of malicious attacks by hostile machines (attackers) designed to shutdown or damage network services. One common type of attack is a distributed denial of service (DDOS) or denial of service (DOS) attack. A DOS attack may encompass one of two common attack types. One type of a DOS attack involves an attacker sending a sufficiently large number of messages to a targeted IP address, such as a client of a network service provider. Another type of attack is more general in nature, and targets the core network of the network service provider, which, in turn, affects service to all clients of the service provider.

DOS attacks generally involve an attacker forging (spoofing) messages and sending the spoofed messages to a targeted destination. The targeted destination may be, for example, a router within the core network of the service provider or a customer of the service provider. With a sufficiently large number of spoofed messages, the targeted destination's services (e.g. phone and data services) may become clogged and rendered inoperable.

Many service providers offer to customers, in addition to network service, detection and mitigation service subscriptions to prevent interruptions in the customer's service due to malicious attacks. Detection services determine whether the subscribed customer or network core is experiencing a DOS attack. On the other hand, mitigation services separate good traffic from bad traffic and forwards the good traffic to the subscribed customers.

Detection service may be provided at the customer-end of the network, or in the core network of the service provider, such as at an incoming provider-edge (PE) router. Further, the detection service may be implemented as computer-readable medium or integrated as a part of the network architecture. At the customer-end of the network, detection service may employ an in-line tap and detector coupled to the service provider's network pathway. A tap may be, in one example, a passive splitter that siphons off a portion of the incoming traffic and directs the siphoned portion to a detector having a suitable bandwidth. The detector monitors the bandwidth usage of the service provider's network by the customer and, over time, determines if the bandwidth usage has increased beyond a certain threshold. This increased use may indicate a malicious attack is in progress. If the detector determines an attack is in progress, the traffic incoming to the customer is routed to a cleaning center. The cleaning center separates the bad traffic from the good traffic. The separation may be based upon information in the header portion of the incoming messages. The good traffic is then redirected to the customer, thus mitigating the malicious attack and minimizing downtime experienced by the customer due to the attack.

At the network core, detection service may employ monitoring tools for collecting information related a trend in the bandwidth usage that extends beyond a certain threshold, which indicates a malicious attack. The monitoring tools may comprise a stand-alone hardware element incorporated into the network architecture or computer-readable medium installed on an existing hardware element. Once the threshold is met, the network service provider shuts down all network elements and pathways in the core network affected by the malicious attack. The shutdown prevents damage and other adverse consequences to components in the core network and related customer-end network elements. Once the monitoring tools determine the malicious attack has subsided, the service provider re-opens all network elements previously shutdown.

One deficiency of the aforementioned detection services on the customer-end is the cost and efficiency of providing detection services for each individual subscribing customer. Further, another deficiency of providing the aforementioned detection services on the front-end provider-edge of the core network is that an outage of network service to all customers occur during the attack. Although a customer subscribes to detection and mitigation services offered by the network service provider, the service shutdown in response to the malicious attack may last about a few hours to a few days.

This background is provided as just that, background. The invention is defined by the claims below, and the listing of any problems or shortcomings of the prior art should not give rise to an inference that the invention is only to address these shortcomings.

SUMMARY

Some embodiments of the present invention solve at least the above problems by providing a system and method for providing efficient and cost-effective detection of malicious attacks on network-service providers and their related customers. Moreover, embodiments of the present invention have several practical applications in the technical arts including, but not limited to, centralization of detection services of malicious attacks at a customer-end of a network core, and differentiation at the network core of inbound network traffic to subscribed and unsubscribed customers of detection and mitigation services of the service provider amid a malicious attack.

In one embodiment, a system is provided for centralizing services subscribed to by customers of a service provider for detecting attacks at the customer-end of a communications network. The system comprises a signal diverter and a detection apparatus common to subscribed customers. In some embodiments, the signal diverter may be employed inline in a signal path carrying inbound communication signals to subscribed customers of the provider. The diverter redirects a portion of the inbound communication signals to a detection apparatus. The detection apparatus receives the diverted portion of the inbound communication signals and determines if each subscribing customer is experiencing an attack. In one embodiment, if a subscribing customer is under attack, the detection apparatus directs the customer's inbound communication signals to another portion of the network for separating attacking signals from legitimate signals inbound to the customer.

In another embodiment, a method is provided for centralizing services subscribed to by customers of a service provider for detecting attacks at the customer-end of a communications network. The method comprises installing a signal diverter in signal path carrying inbound communication signals common to at least a portion of subscribed customers and diverting a portion of the collective inbound signals for each customer to a detection apparatus. Finally, determining, based on parameters for each subscribed customer, if a subscribed customer is experiencing an attack. In one embodiment, the method further comprises directing the customer's inbound communication signals to another portion of the network for separating attacking signals from legitimate signals inbound to the customer.

Still another embodiment, a method is provided for detection of network service attacks on end-users or customers of a communications network subscribing to attack detection and mitigation services, each customer having separate access points to the communications network. The method comprises providing network access to the customers by a common communications path, and diverting a portion of the collective communication signals, prior to reaching the customers, to a detection apparatus. Based on parameters for each subscribed customer, determining the quality of network service for each customer. The quality of network service may be used to determine if a subscribing customer is under attack, and, if so, in some embodiments, the method further comprises forwarding the customer's incoming signals to a cleaning center that may be located in a separate portion of the communications network to retrieve legitimate signals inbound to the subscribing customer.

BRIEF DESCRIPTION OF THE SEVERAL
VIEWS OF THE DRAWINGS

Embodiments of the present invention are described in detail below with reference to the attached drawing figures, which are incorporated by reference herein and wherein.

DETAILED DESCRIPTION OF THE INVENTION

The various embodiments of the present invention provide a system and method for providing efficient and cost-effective detection services of malicious attacks on network service providers and their related customers. More particularly, but not by way of limitation, embodiments of the present invention provide for centralizing services subscribed to by customers of a service provider for detecting attacks at the customer-end of a communications network. Moreover, but not by way of limitation, embodiments of the present invention provide for detection services at a front-end provider edge with the feature of differentiating between subscribing and non-subscribing customers of a network service provider's detection and mitigation services.

Further, various technical terms are used throughout this description. A definition of such terms can be found in *Newton's Telecom Dictionary* by H. Newton, 20th Edition (2004). These definitions are intended to provide a clearer understanding of the ideas disclosed herein but are in no way intended to limit the scope of the embodiments of the present invention. The definitions and terms should be interpreted broadly and liberally to the extent allowed the meaning of the words offered in the above-cited reference.

As one skilled in the art will appreciate, the embodiments of the present invention may take the form of, among other things: a method, system, or computer-program product. Accordingly, the embodiments of the present invention may take the form of a hardware embodiment, a software embodiment, or an embodiment combining software and hardware. Embodiments of the present invention include the form of a computer-program product that includes computer-useable instructions embodied on one or more computer-readable media.

Computer-readable media include both volatile and non-volatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
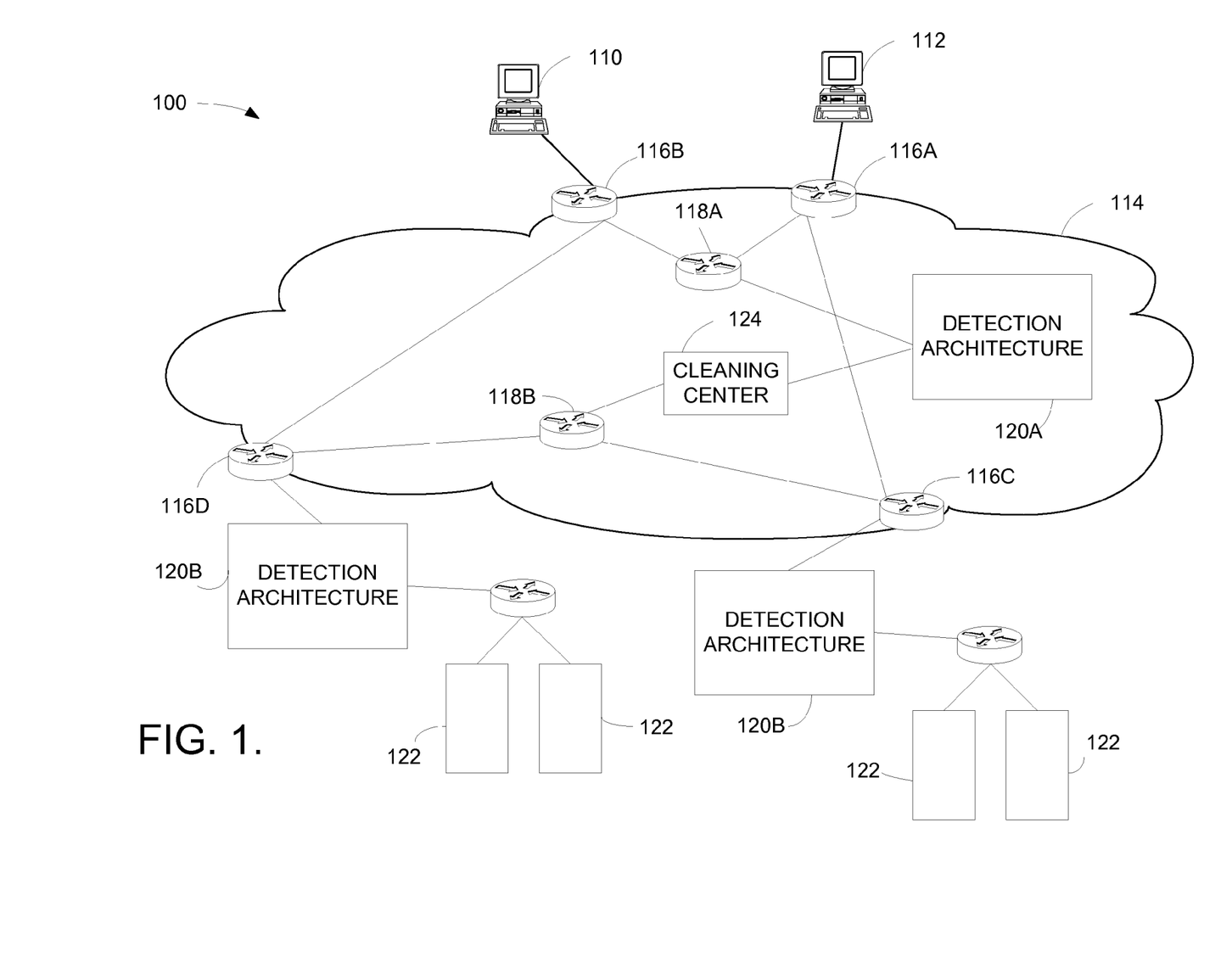
FIG. 1 is a diagram of one embodiment of the present invention illustrating detection services deployed in a communications network.

Turning now to FIG. 1, there is illustrated one embodiment of an exemplary communications network architecture 100. Architecture 100 includes, but is not limited to, machines 110 and 112 that generate inbound communication signal traffic to customers 122 through provider-edge access points 116A and 116B. The inbound traffic may comprise both legitimate traffic and traffic for purposes of malicious attacks.

Machines 110 and 112 may include, but are not limited to personal computers or computer terminals. Architecture 100 further includes, but is not limited to, a network 114, customer-edge access points 116C and 116D, detection service architectures 120A and 120B, and routers and/or switches 118A and 118B. Access points 116A-D may include, but are not limited to routers and/or switches. The aforementioned components of architecture 100 provide a simplified network architecture having detection and mitigation services integrated therein for purposes of illustrating general concepts involved in the various embodiments of the present invention. Thus, architecture 100 is not intended to limit the scope of the various embodiments of the present invention. Other embodiments may include additional access points, routers and/or switches, and additional detection service architectures.

With continuing reference to FIG. 1, detection service architecture 120A detects malicious attacks from hostile machines 110 and/or 112 at front-end provider-edge access points 116A and 116B of network 114. Architecture 120A receives incoming communication signals from access points 116A and 116B via router and/or switch 118A and distinguishes between customers subscribed to detection and mitigation services and non-subscribed customers. When an attack is underway, detection center 120A forwards a subscribed customer's inbound communication signal traffic to cleaning center 124. Cleaning center 124 performs attack mitigation services for subscribed customers 122. More particularly, cleaning center 124 separates attacking inbound communication signal traffic (bad traffic) from legitimate inbound communication signal traffic (legitimate traffic). Detection architectures 120B provide detection services at the customer-end of network 114. If detection architectures 120B determine an attack is underway, incoming communication signals to customers 122 are forwarded via router and/or switch 118b to cleaner center 124. The infrastructure and functionality of detection architecture 120A will be discussed in further detail with reference to FIGS. 4-6. The infrastructure and functionality of detection architecture 120B will be discussed in further detail with reference to FIGS. 2A-3C.

Figure 2A:
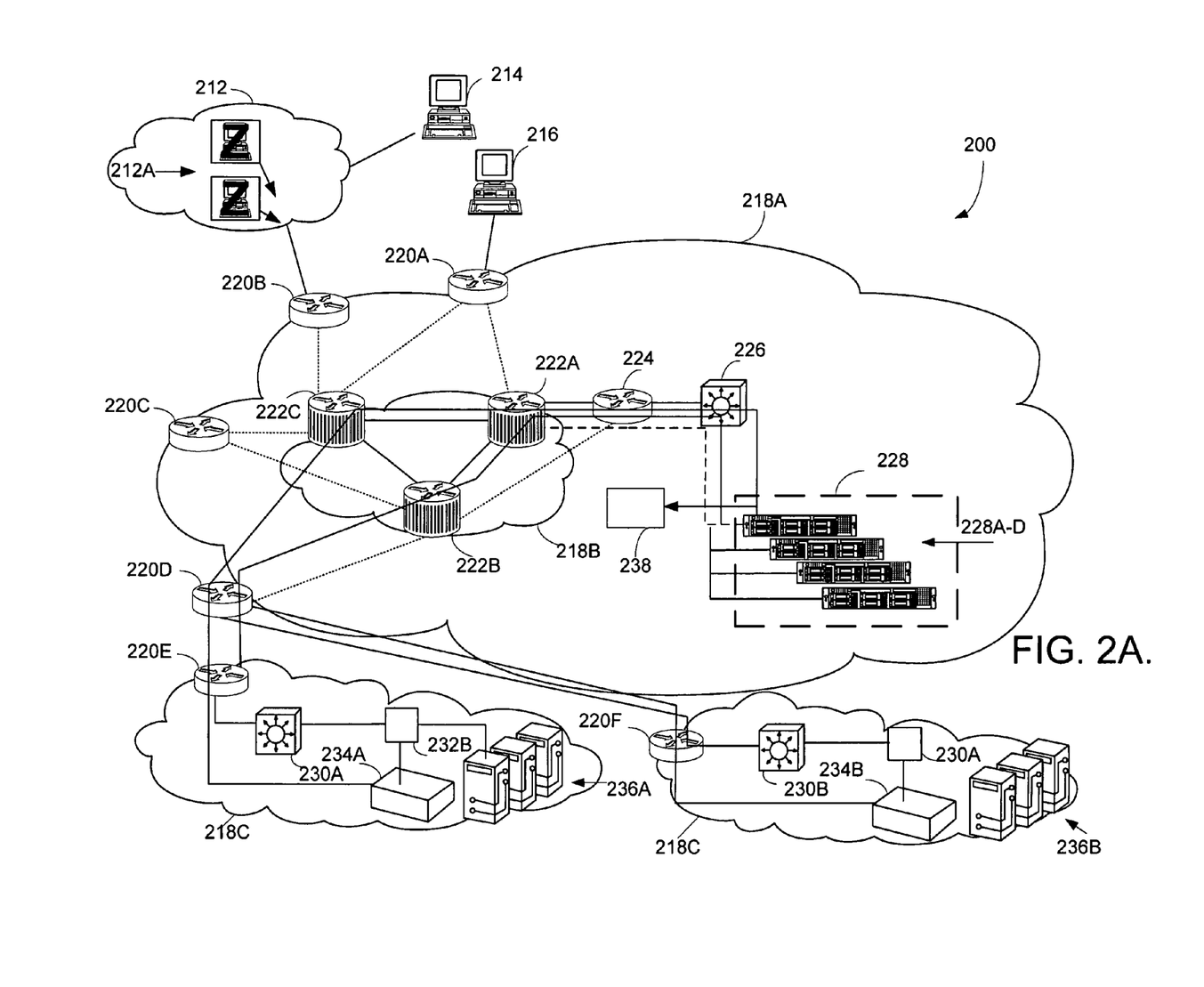
FIG. 2A is a diagram illustrating one embodiment of FIG. 1 illustrating detection services architecture at the customer-end of communications network.

Referring now to FIG. 2A, there is illustrated one embodiment of detection service architecture at the customer-end of a communications network. A system architecture 200 comprises a malicious attacker-machine 214, a legitimate user-machine 216, front-end provider-edge access points 220A and 220B, customer-end provider-edge access points (router and/or switch) 220C and 220D, subscribing customers 236A and 236B, communications network 218A, network core 218B, router and/or switch 224, and cleaning center 238. Subscribing customers 236A and 236B comprise customer-edge routers 220E and 220F, switches and/or routers 230A and 230B, in-line communication signals taps 232A and 232B, customer networks 218C, detectors 234A and 234B. Network 218A further comprises differentiator 228. Differentiator 228 comprises routers and/or switches 228A-D coupled to cleaning center 238. Further, routers and/or switches 228A-D may be coupled to databases (not shown) comprising subscribing customer information. Network core 218B further comprises routers and/or switches 222A-222C. A network 212 is provided for illustrative purposes and comprises a collection of "zombie" machines 212A. The zombie machines 212A provide a collection of potential addresses that an attacker-machine may utilize for spoofing messages.

In operation, network 218A of system architecture 200 receives legitimate inbound communication signal traffic from user-machine 216 and malicious inbound communication signal traffic from attacker-machine 214 at provider-edge access points 220A and 220B. Provider-edge access points 220A and 220B route the incoming traffic, which includes both legitimate traffic from user-machine 216 and attacking traffic from attacker-machine 214 to core network 218B. Routers and/or switches 220A-220C route the incoming traffic to customer-end provider-edge access point 220D. Access point 220D routes inbound traffic to subscribing customers 236A and 236B via customer-edge routers and/or switches 220E and 220F. Inbound traffic to subscribing customers 236A and 236B is routed through switches 230A and 230B and taps 232A and 232B. Taps 232A and 232B may be passive taps. In one embodiment, a passive tap comprises a splitter which diverts a portion of the total inbound traffic to a detector to detectors 234A and 234B prior to the inbound traffic reaching customer networks 218C.

Continuing with FIG. 2A, customers 236A and 236B are allotted a certain amount of bandwidth to access network 218A. Customers 236A and 236B may be, for example, but not by way of limitation, DS-1 customers or fast-Ethernet customers. Detectors 234A and 234B monitor the inbound traffic and over time determine if the inbound traffic is above a certain threshold specific for customers 236A and 236B. This technique may be termed "trending". If detectors 234A and 234B determine that the amount of inbound traffic is increasing or shows a spike, detectors 234A and 234B determine that an attack is underway and route inbound traffic to customers 236a and 236B to differentiator 228A via router and/or switch 224. Differentiator 228 determines the preferences stored in data structures for customers 236A and 236B and forwards inbound traffic to customers 236A and 236B is diverted to cleaning center 238. Cleaning center 238 separates the attacking or bad traffic inbound traffic from legitimate inbound traffic. In one embodiment, this may be done by analyzing the header fields of the inbound traffic to the subscribing customers.

Figure 2B:
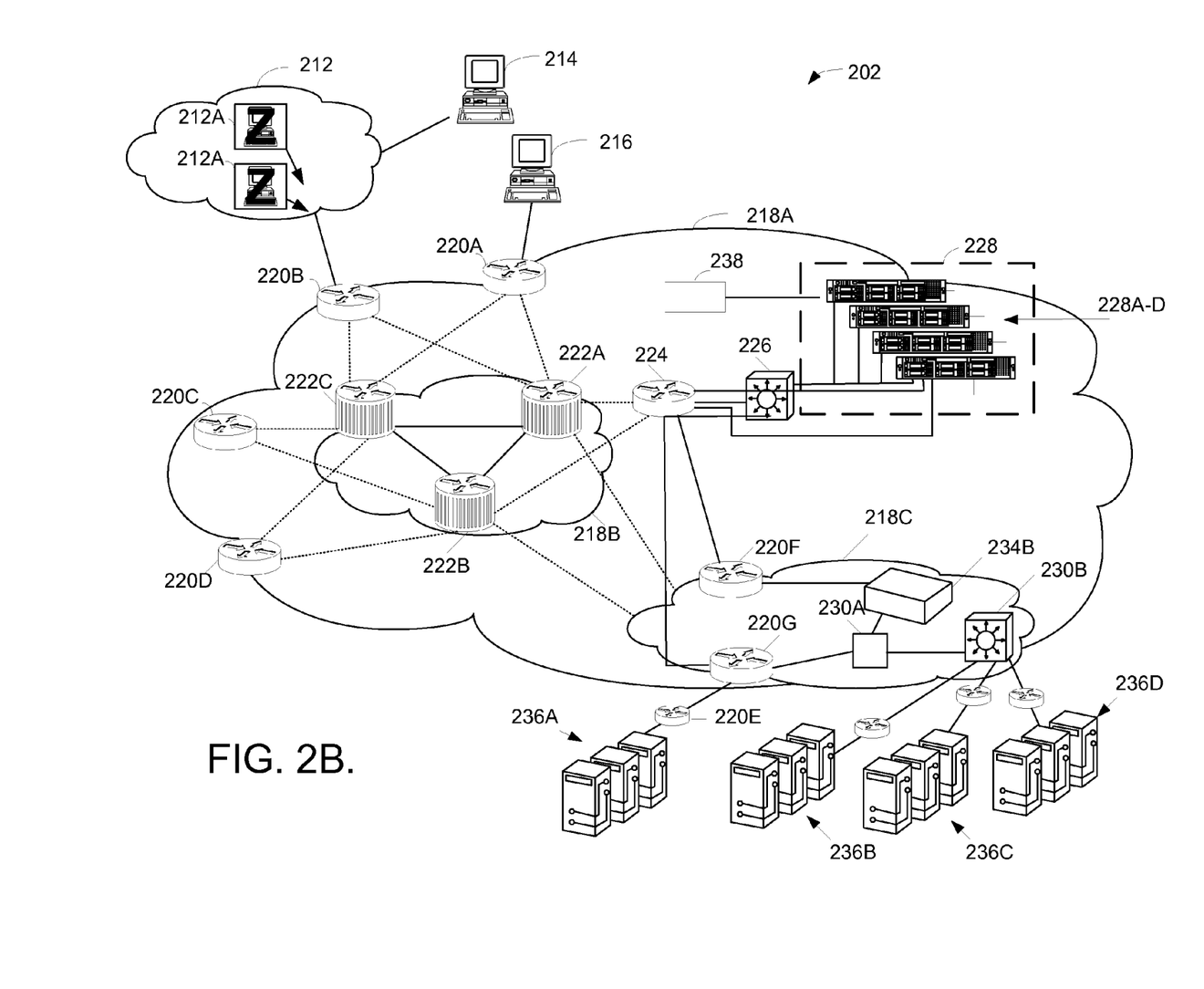
FIG. 2B is a diagram of another embodiment FIG. 1 illustrating detection service architecture at the customer-end of communications network.

Referring now to FIG. 2B, there is illustrated one embodiment of the present invention for consolidating detection service architecture at the customer-end of a communications network. In FIG. 2B, components common to FIG. 2A will have the same number in FIG. 2B. A system architecture 202 comprises substantially the same elements as FIG. 2A, with the exception of a consolidated or centralized detection center 218C. Detection center 218C comprises a router and/or switch 220G for accepting inbound traffic and a common tap 230A, detector 234B, router and/or switch 220F, and router and/or switch 230B. Also illustrated in system 200 are customers 236A, 236B, 236C and 236D. Customers 236B-D are customers that subscribe to the network service provider's detection and mitigation services, while customer 236A is a non-subscriber.

System 202 of FIG. 2B operates in substantially the same manner as system 200 of FIG. 2A, with inbound traffic received at router and/or switch 220G. Router and/or switch 220G is in communication with differentiator 228 and based on subscribing customers included in databases 228A-228D and differentiator 228 routes traffic directly to either customer-edge router and/or switch 220E or common tap 230A. tap 230A, as in FIG. 2A, diverts a portion of inbound communication signals to subscribing customers 236B-D to a common detector 234B. As in system 200 of FIG. 2A, common detector 234B analyzes, based on the bandwidth requirements of subscribing customers 236B-D, whether or not a substantial increase in inbound communication signal traffic is occurring. If a substantial increase in traffic is inbound to subscribing customers 236B-D, detector 234B routes the inbound traffic via router and/or switch 220F to differentiator 228, or to cleaning center 238 via router and/or switch 224. In this way, subscribing customers 236b-d do not each individually include a tap 230A and detector 234B. Requirements for common tap 230A and detector 234B will be discussed in further detail in regards to FIGS. 3A-3B.

Figure 3A:
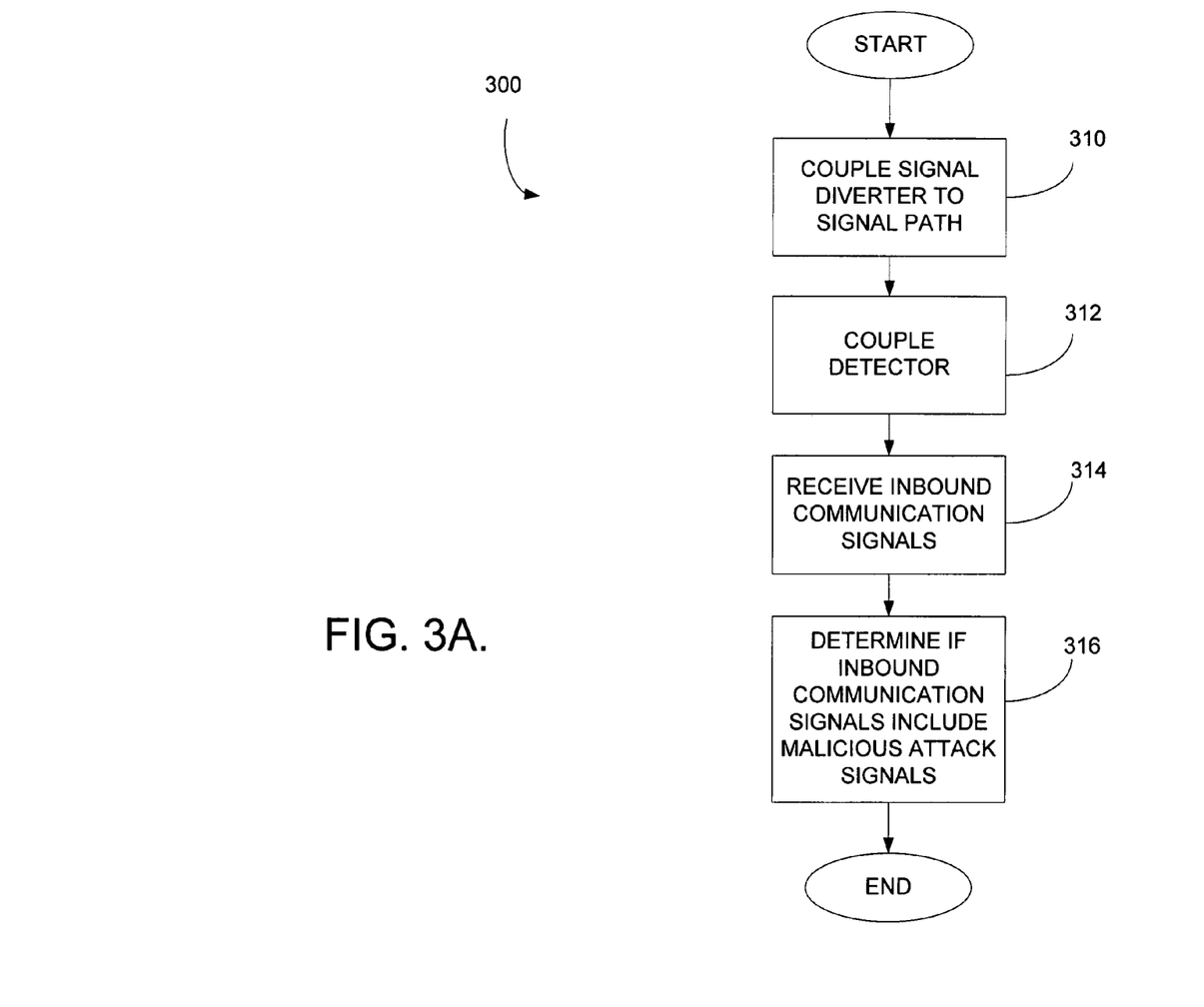
FIG. 3A is a flowchart illustrating one embodiment of a method for centralizing services subscribed to by customers of a service provider for detecting attacks at the customer-end of a communications network.

Referring now to FIG. 3A, there is illustrated one embodiment of a method 300 for centralizing detection services subscribed to by customers of service providers at the customer-end of a communications network. At a step 310 a signal diverter or tap is coupled to a communication signal path carrying inbound communication signals to a customer. At a step 312, a detection apparatus or detector is coupled to the signal diverter. At a step 314, a portion of the inbound communication signals propagating through the signal path is diverted to the detection apparatus or detector. Finally, At a step 316, method 300 includes determining, based on parameters for each customer, if the customer is experiencing a malicious attack. The parameters include, but are not limited to, normal bandwidth usage of the customer and the customer's allotted bandwidth.

Figure 3B:
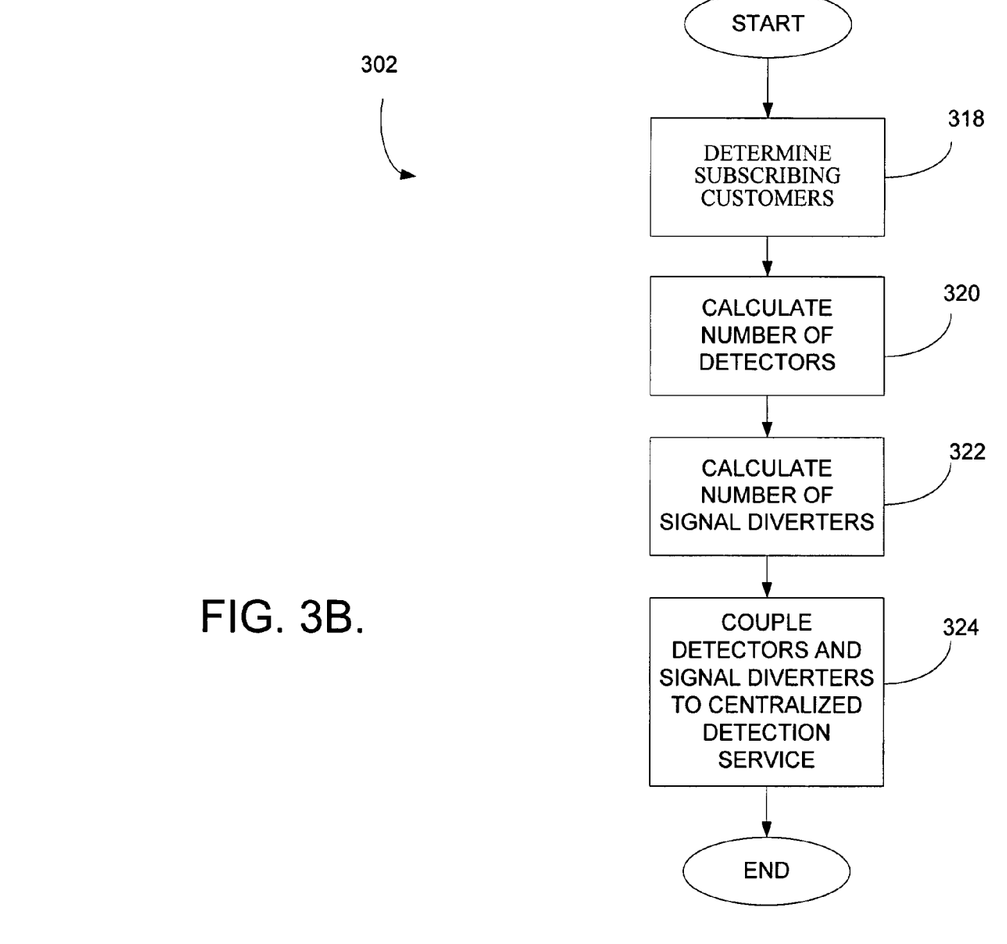
FIG. 3B is a flowchart of one embodiment of the present invention illustrating a method for determining components of the architecture of FIG. 2B.

Referring to FIG. 3B, there is illustrated an embodiment of the present invention of a method 302 for selecting components of a detection architecture for detection services at the customer-end. For example, but not by way of limitation, detection architecture 200 of FIG. 2B. Centralizing detection services may require selecting a number of taps and the number of detectors required to centralize detection services described in the aforementioned FIGS. 1-3A. With reference to FIG. 3B, at a step 318, the number of subscribing customers and their respective allotted bandwidth usage is determined to select a suitable detector and tap. At a step 320, the total number of detectors required to centralize detection services is determined. The selection of detectors may be limited to the bandwidth of available detectors. For example, but not by way of limitation, available detectors may have bandwidths of 1000 Mbps (Mega-bits-per-second). Assume that at step 318, the number of customers and respective allotted bandwidths are as follows:

A=number of DS-1 (1.544 Mbps) customers;
B=number of DS-3 (44.736 Mbps) customers;
C=number of OC-3 (155.52 Mbps) customers;
D=number of OC-12 (622 Mbps) customers;
E=number of fast-Ethernet (100 Mbps) customers; and
F=number of gigabyte-Ethernet (1000 Mbps) customers.

Given the aforementioned information, the total number of detectors having a bandwidth of X Mbps for centralizing detection services is calculated using equation (1) below.

$$\text{Total detectors} = \frac{A*1.544 + B*44.736 + C*155.52 + D*622 + E*100 + F*1000}{X} \quad (1)$$

Given the bandwidth of available detectors is 1000 Mbps, and assuming, for simplicity, the number of customers for each allotted bandwidth offered by a service provider is one, then the total detectors should be at least two. The total number of detectors from equation (1) should be rounded-up to the nearest integer.

Continuing with method 302 of FIG. 3B, at a step 320 the total number of taps required to centralize detection services may be calculated in a similar manner. For example, given the number of customers for each bandwidth offered by the service provider as determined in step 318, the minimum number of taps may be calculated as follows using equation (1) above. In other words, assuming the tap has a bandwidth of 1000 Mbps, the total number of taps should be, Total taps=$A*0.001544+B*0.044736+C*0.15552+D*0.622+E*0.1+F$.

The total number of taps should be the nearest rounded-up integer of the above result. In this example, the total number of taps should be 2.

At a step 324, the detectors and taps are coupled between one provider-edge router and/or switch and another provider-edge router and/or switch that is coupled to the customer-edge routers and/or switches which service the subscribing customers. Thus, to service six subscribing customers having varying allotted bandwidths, two detectors and taps should be used.

Figure 4:
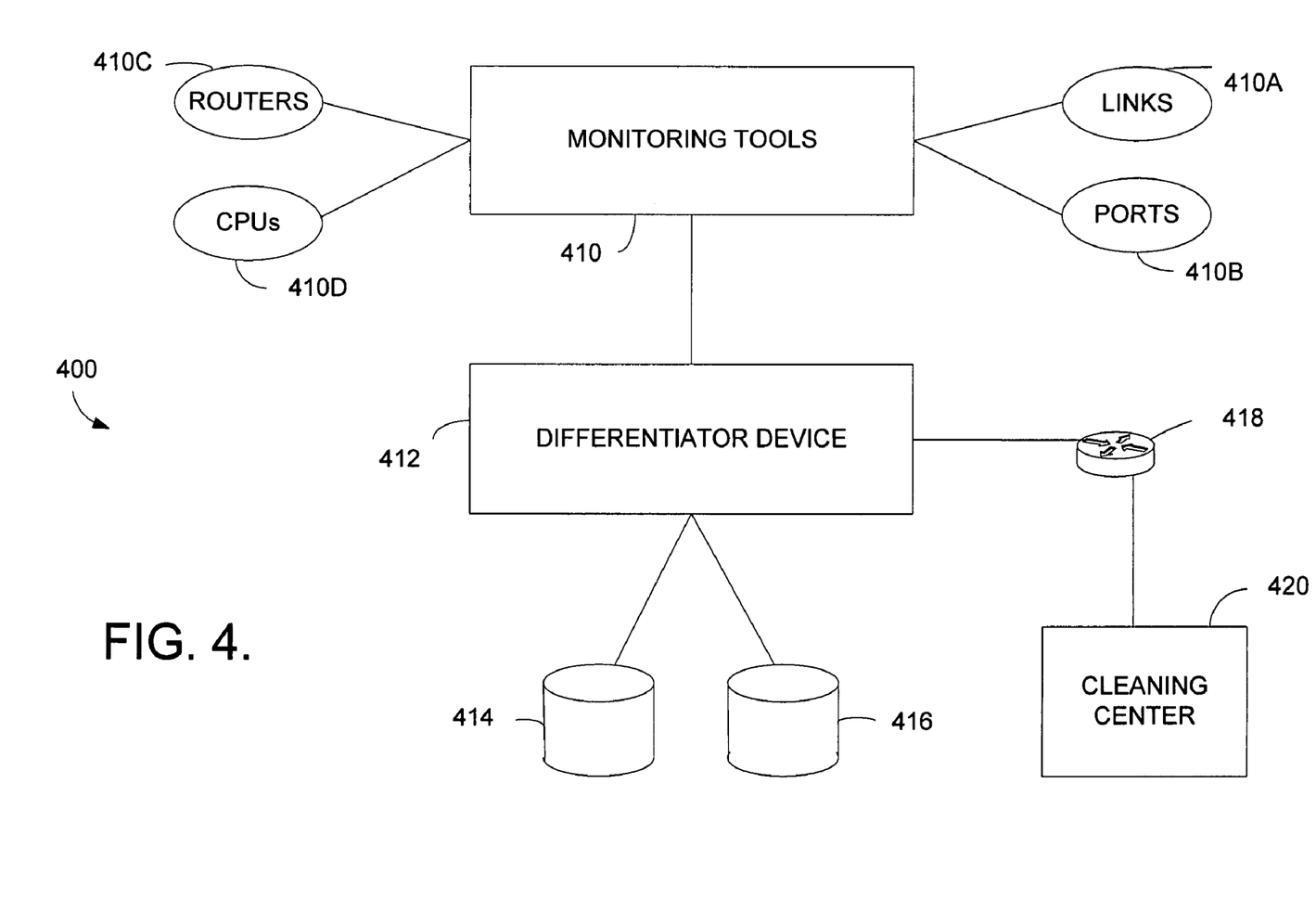
FIG. 4 is a diagram of one embodiment of the present invention illustrating detection services at a front-end provider-edge.

Referring again to FIG. 1, the infrastructure and functionality of detection architecture 120A may be illustrated by exemplary detection architecture 400 of FIG. 4. In FIG. 4, there is shown one embodiment of the present invention illustrating detection service architecture 400 at a front-end provider-edge of a service provider's network. Detection service architecture 400 comprises monitoring tools 410, differentiator 412, data structures 414 and 416, router and/or switch 418, and cleaning center 420. Monitoring tools 410 include, but not limited to a computer-readable medium located on a processor in network 114 of FIG. 1 or integrated into a provider-edge router and/or switch. Monitoring tools 410 collect data and statistics (network resource utilization) relating to various elements in the infrastructure of a service provider's network. Monitored elements may include, but are not limited to, signal pathways or links 410A, access points (router and/or switches) 410B, ports 410C, and processors 410D. The statistics and data collected by monitoring tools 410 may be utilized to indicate whether or not the service provider's infrastructure is under attack. Once a determination is made regarding an attack, inbound communication signal traffic may be diverted to differentiator 412. Differentiator 412 accesses data structures 414 and 416 to determine if a subscribed customer's inbound traffic or other traffic designated for protection is affected. The subscribed customer's inbound traffic and other traffic is then forwarded through a router and/or switch 418 to cleaning center 420 for separating the attacking traffic from the legitimate traffic.

Figure 5:
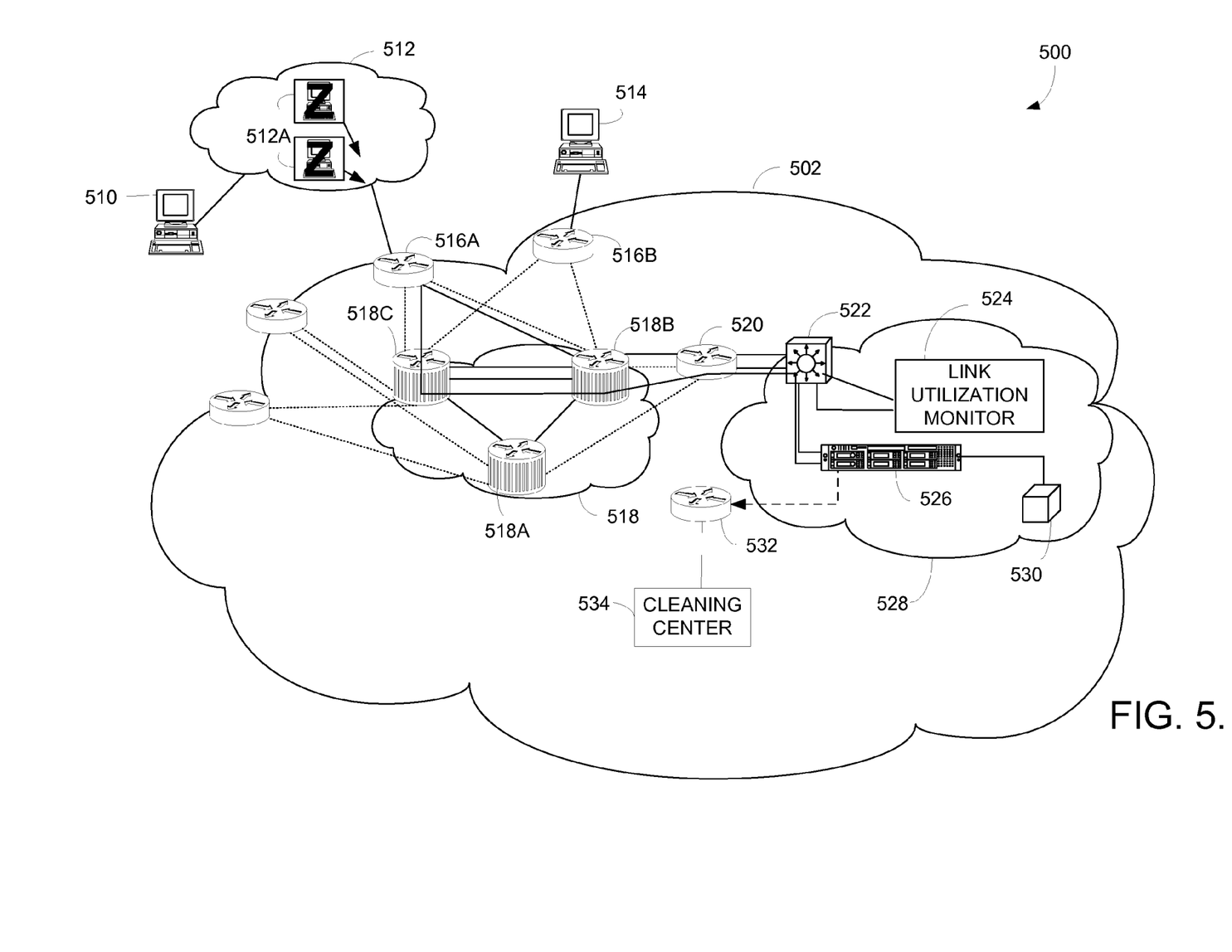
FIG. 5 is a diagram of the network architecture of FIG. 4.

Referring now to FIG. 5, there is illustrated in greater detail the detection service architecture 400 discussed in relation to FIG. 4. In FIG. 5, detection service architecture 500 includes a service provider network 502, a malicious attacker-machine 510, a network 512 having a collection of "zombie" machines 512A, a legitimate user-machine 514, and front-end provider-edge routers and/or switches 516A-B for receiving inbound communication signal traffic. Network 502 includes network core 518 having routers and/or switches 518A-C. The aforementioned monitoring tools may be incorporated into routers and/or switches 518A-C or front-end provider-edge routers and/or switches 516A-B. Network 502 further includes a detection architecture 528 and a cleaning center 534 coupled to detection architecture 528 through a router and/or switch 532. Further, detection architecture 528 is coupled to network core 518 through a router and/or switch 522. Detection architecture 528 includes a differentiator 526, data structures 530 and link utilization monitor 524.

In operation, attacker-machine 510 may generate a malicious attack on network 502 incorporating spoofed messages using zombie machines 512A of network 512. Legitimate inbound communication signal traffic may be generated by legitimate user-machine 514. Both attacking and legitimate inbound communication signals are received by provider-edge routers and/or switches 516A-B and forwarded to routers and/or switches 518A-C in network core 518. Monitoring tools incorporated into network core 518 analyze statistics of inbound communication signal traffic as discussed above in relation to FIG. 4. Once the malicious attack from attacker-machine 510 is detected, the inbound communication signals may be redirected to detection architecture 528 through router and/or switch 520. Inbound communication signals may be redirected by way of a virtual network path or predetermined routing protocols. Router and/or switch 522 receives the redirected inbound communication signals and forwards the signals to the link utilization monitor (LUM) 524. LUM 524 processes the redirected signals and determines if network 502 is experiencing an attack. If LUM 524 determines an attack is underway, the redirected signals are forwarded to differentiator 526 to determine if said signals include subscriber and/or protected traffic. Differentiator 526 consults data structures 526A for subscriber and protected traffic information and forwards the redirected signals having the subscriber and protected traffic information to cleaning center 534 through router and/or switch 532. As previously discussed, cleaning center 534 separates attacking and legitimate communication signal traffic and forwards legitimate traffic to the subscribing customers.

Figure 6A:
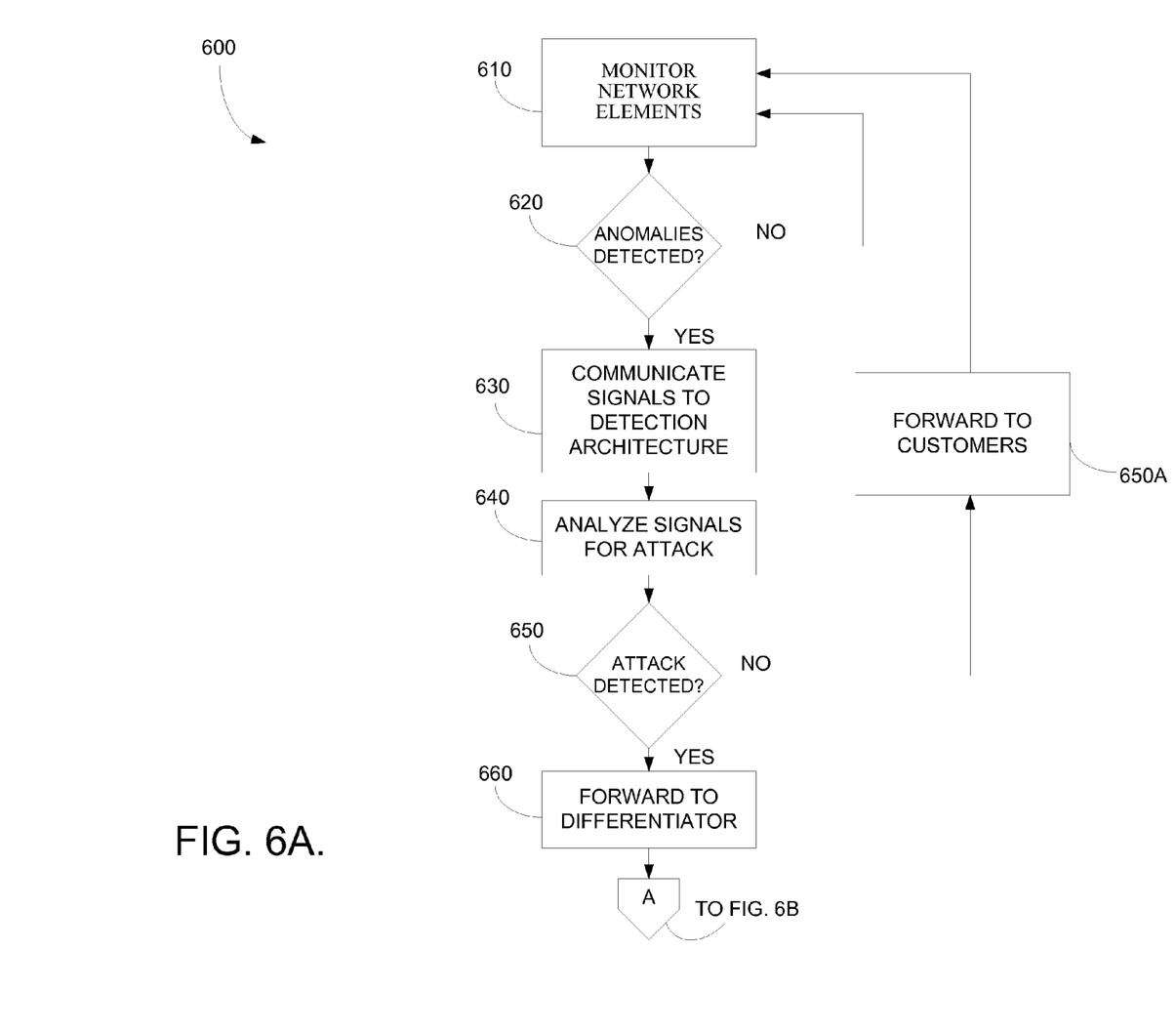
FIGS. 6A and 6B is a flowchart illustrating a method for implementing the architecture of FIGS. 4-5.

Referring now to FIG. 6, there is shown one embodiment of the present invention of a method 600 for detecting a malicious attack on a service provider's infrastructure at a front-end provider-edge of the service provider's network. At a step 610, elements within the service provider's network are monitored for predetermined changes in the element's usage statistics. As previously discussed, a significant change in usage statistics over time (trending) may indicate a network is under attack by a hostile machine. At a step 620, if anomalies are detected in the usage statistics of the various monitored network elements, the inbound communications signal traffic may be diverted to a detection architecture at a step 630. This diversion of inbound traffic may be accomplished by routing changes or by creating virtual network pathways. The creation of virtual network pathways may be termed "tunneling." Typical tunneling mechanisms known in the art include, but are not limited to GRE, and L2TPv3. If, however, no anomalies are detected, method 600 returns to step 610 and continues to monitor usage statistics of elements of the service provider's network.

Figure 6B:
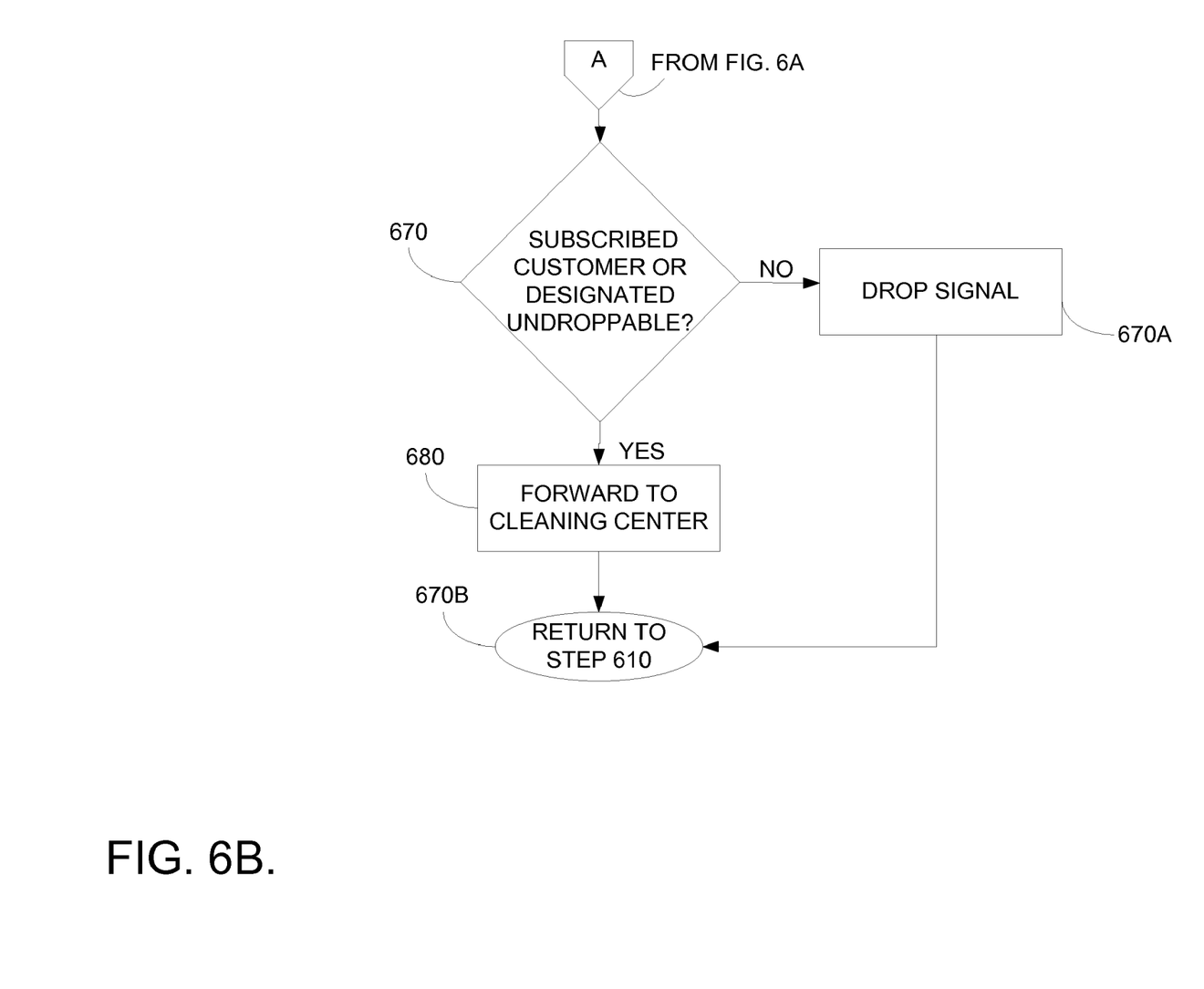

Continuing at a step 640, the diverted inbound traffic is forwarded a processor, such as LUM 524 of FIG. 5, for further analysis to determine if the service provider's network is under attack. At a step 650, if a determination is made that an attack is underway, the inbound communication signal traffic is forwarded to a differentiator at a step 660. The differentiator may consult a data structure or data structures having listings of customers subscribed to detection and mitigation services and other inbound communication signals, such as emergency traffic, specified by the provider for detection and mitigation service protection at a step 670. The data structures may reside internal to the differentiator or in external data structures. Further, the data structures may be located either in a single location, or distributed throughout the provider's network. Returning to step 650, if the processor or LUM 524 of FIG. 5 determines the provider's network is not subject to a malicious attack, at a step 650A the diverted inbound traffic is forwarded to the provider's customer's without any further action and method 600 returns to monitoring network elements at step 610.

Continuing at step 670, for each inbound communication signal, the differentiator determines if the inbound signal is for a subscribed customer or designated as protected by the network service provider. In one embodiment, this may be done by analyzing information contained in the header field of the inbound message. For the aforementioned inbound communication signals for subscribed customers, at a step 680 the differentiator forwards the signals to a cleaning center to remove the malicious attack communication signal traffic from the legitimate traffic. If, however, an inbound communication signal is not designated protected or relates to an unsubscribed customer, the inbound traffic is dropped at a step 670A. At a step 670B, when the processor or LUM 524 of FIG. 5 determines the attack has subsided, method 600 returns to monitoring usage statistics for the provider's network elements at step 610.

As can be seen, the embodiments of the present invention and its equivalents are well-adapted to provide a new and useful method and system for detecting malicious attacks at a customer-end of a service provider's communications network. Many different arrangements of the various components depicted, as well as components not shown, are possible without departing from the spirit and scope of the embodiments of the present invention.

The embodiments of the present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the embodiments of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A shared-tap based system associated with a service-provider network for detecting attacks that are directed toward one or more end-users of a communications network, the system comprising:

at least one signal diverter coupled to at least one signal path in the service-provider network carrying communication signals to the end-users; and at least one detection apparatus coupled to the signal diverter in the service-provider network which monitors the communication signals for the presence of an attack signal directed toward one or more of the end-users, wherein the at least one signal diverter duplicates the communication signals and communicates the duplicated communication signals to the at least one detection apparatus, and wherein a total number of detection apparatuses is determined according to a bandwidth capability for each one of the detection apparatuses and a respective allotted bandwidth for each of the end-users;

wherein the total number of detection apparatuses is determined by:

a respective allotted bandwidth for each of the end-users;

a total number of end-users for each of the respective allotted bandwidths;

a plurality of bandwidth multiplicity factors, wherein each of the plurality of bandwidth multiplicity factors is determined by a multiplication of the respective allotted bandwidth for each of the end-users times the total number of end-users for each of the respective allotted bandwidths;

a bandwidth summation, determined by a combined total of all of the plurality of bandwidth multiplicity factors; and the total number of detection apparatuses, determined by the bandwidth summation, per a desired centralized detector apparatus bandwidth.

2. The system of claim 1, further comprising at least one processing apparatus coupled to the at least one detection apparatus which removes attack signals from the communication signal traffic directed toward at least one of end-users.

3. The system of claim 1, wherein each of said at least one signal diverter carries communication signals to a plurality of end-users, and each of said at least one detection apparatus monitors the communication signals for a plurality of end-users.

4. The system of claim 1, wherein the at least one signal diverter redirects a portion of the communication signals to the at least one detection apparatus.

5. A shared-tap based method for a service-provider to detect network service attacks directed toward one or more end-users of a communications network, comprising:
   coupling at least one signal diverter to at least one signal path carrying communication signals to end-users;
   determining a total number of detection devices required, according to a bandwidth capability for each one of the detection devices and a respective allotted bandwidth for each of the end-users;
   wherein said determining a total number of detection devices comprises:
   a) providing a respective allotted bandwidth for each of the end-users:
   b) determining a total number of end-users for each of the respective allotted bandwidth;
   c) multiplying each of the allotted bandwidth of step a, times the total number of end-users for each of the respective allotted bandwidth of step b, to obtain a plurality of bandwidth multiplicity factors;
   d) adding together all of the plurality of bandwidth multiplicity factors of step c, to obtain a bandwidth summation; and
   e) dividing the bandwidth summation of step d, by a desired centralized detector apparatus bandwidth;
   receiving the communication signals at one or more of the detection devices;
   the one or more detection devices monitoring the communication signals for a presence of an attack signal directed toward one or more of the end-users;
   duplicating the communication signals by the at least one signal diverter; and
   communicating the duplicated communication signals to the one or more detection devices.

6. The method of claim 5, further comprising: coupling at least one processing apparatus to the at least one detection devices; and
   the at least one processing apparatus removing attack signals from the communication signal traffic directed toward at least one of end-users.

7. The method of claim 5, wherein each of said at least one signal diverter carries communication signals to a plurality of end-users, and each of said one or more detection devices monitors the communication signals for a plurality of end-users.

8. The method of claim 5, further comprising the at least one signal diverter redirecting a portion of the communication signals to the one or more detection devices.

9. The method of claim 6, further comprising:
   selecting at least one set of end-users from end-users; and
   providing detection of network service attacks for the at least one set of end-users.

10. The method of claim 9, wherein the one or more detection devices monitoring the communication signals further comprises:
    creating a set of parameters for each end-user in the at least one set of end-users; and
    based on the set of parameters, determining if each end-user in the at least one set of end-users is under attack.

11. The method of claim 10, wherein creating the set of parameters further comprises:
    ascertaining a bandwidth-usage limit for each of the at least one set of end-users, the limit being an amount of the communications network's resources allotted to each of end-users;
    determining an average usage of the bandwidth-usage limit for each of the at least one set of end-users; and
    based on the bandwidth-usage limit and the average usage, for each of the at least one set of end-users establishing a threshold, the threshold providing a basis for determining if each end-user in the at least one set of end-users is under attack.

12. The method of claim 11, further comprising:
    monitoring the communication signals for each end-user in the at least one set of end-users for an increase in bandwidth-usage above the threshold;
    if a bandwidth-usage for an end-user in the at least one set of end-users remains above the threshold for a predetermined amount of time, determining that the end-user is under attack; and
    routing the communication signals for the end-user to the processing apparatus.

13. A shared tap based method for providing detection of denial of service (DOS) attacks on a plurality of protected end-users of a communications network, the method comprising:
    providing network access to the plurality of protected end-users by a common communications path carrying inbound communications signals to each of the plurality of protected end-users;
    prior to reaching the plurality of protected end-users, communicating a portion of each of the inbound communication signals to at least one detection apparatus;
    determining a total number of said detection apparatuses required, according to a bandwidth capability for each one of said detection apparatuses and a respective allotted bandwidth for each of said end-users;
    wherein said determining a total number of said detection apparatuses comprises:
    a) providing a respective allotted bandwidth for each of said end-users;
    b) determining a total number of end-users for each of said respective allotted bandwidth;
    c) multiplying each of said allotted bandwidth of step a, times said total number of end-users for each of said respective allotted bandwidth of step b, to obtain a plurality of bandwidth multiplicity factors;
    d) adding together all of said plurality of bandwidth multiplicity factors of step c, to obtain a bandwidth summation; and
    e) dividing said bandwidth summation of step d, by a desired centralized detector apparatus bandwidth; and
    determining quality of network service for each of the plurality of protected end-users, wherein the quality of the network service may indicate a DOS attack.

14. The method of claim 13, further comprising:
    measuring the quality by monitoring bandwidth-usage over an interval of time; and comparing an average bandwidth-usage established for each of the plurality of protected end-users to the monitored bandwidth-usage over the interval of time, wherein the comparison may be indicative of a DOS attack on one or more of the plurality of protected end-users.

15. The method of claim 14, further comprising:

for each comparison indicative of a DOS attack, routing the communication signals to at least one processing apparatus; and the at least one processing apparatus removing attack signals from the communication signal traffic directed toward at least one of the plurality of protected end-users.

16. The method of claim 13, wherein communicating a portion of each of the inbound communication signals comprises redirecting a portion of the communication signals to the at least one detection apparatus.

17. The method of claim 13, wherein communicating a portion of each of the inbound communication signals further comprises:

duplicating the communication signals; and communicating the duplicated communication signals to the at least one detection apparatus.

* * * * *